(12) United States Patent
Ohkita et al.

(10) Patent No.: US 11,261,004 B2
(45) Date of Patent: Mar. 1, 2022

(54) METAL CASE

(71) Applicant: OHKITA SEISAKUSYO, Takatsuki (JP)

(72) Inventors: Yoshifumi Ohkita, Osaka (JP); Masaya Hamamoto, Osaka (JP); Kouji Ohkita, Osaka (JP)

(73) Assignee: OHKITA SEISAKUSYO, Takatsuki (JP)

( * ) Notice: Subject to any disclaimer, the term of this patent is extended or adjusted under 35 U.S.C. 154(b) by 104 days.

(21) Appl. No.: 16/634,636

(22) PCT Filed: Jan. 9, 2020

(86) PCT No.: PCT/JP2020/000384
§ 371 (c)(1),
(2) Date: Jan. 28, 2020

(87) PCT Pub. No.: WO2020/208887
PCT Pub. Date: Oct. 15, 2020

(65) Prior Publication Data
US 2021/0237930 A1    Aug. 5, 2021

(30) Foreign Application Priority Data
Apr. 10, 2019    (JP) .............................. JP2019-075133

(51) Int. Cl.
*B65D 6/32* (2006.01)
*B65D 6/02* (2006.01)
*F16B 5/08* (2006.01)

(52) U.S. Cl.
CPC ................. *B65D 7/38* (2013.01); *B65D 7/06* (2013.01); *F16B 5/08* (2013.01)

(58) Field of Classification Search
CPC   F16B 9/01; F16B 11/00; F16B 11/004; F16B 5/08; B65D 2501/24025;
(Continued)

(56) References Cited

U.S. PATENT DOCUMENTS

| 829,477 A | * | 8/1906 | Kruse | ...................... B65D 7/34 |
| | | | | 220/620 |
| 3,586,204 A | * | 6/1971 | Roper | ...................... B65D 7/12 |
| | | | | 220/200 |

(Continued)

FOREIGN PATENT DOCUMENTS

| CN | 103779531 A | 5/2014 |
| CN | 207637925 U | 7/2018 |

(Continued)

OTHER PUBLICATIONS

Jun. 9, 2020 Office Action issued in Japanese Patent Application No. 2019-075133.

(Continued)

*Primary Examiner* — J. Gregory Pickett
*Assistant Examiner* — Kareen K Thomas
(74) *Attorney, Agent, or Firm* — Oliff PLC

(57) ABSTRACT

A metal case has a bottom part composed of a metal plate, and a side wall part composed of a metal plate that stands from an outer peripheral edge of the bottom part. A boundary part between the bottom part and the side wall part includes a welding portion formed by welding the both parts together. The welding portion is exposed on a surface of the metal case on a lower side in a standing direction of the side wall part. And, a lower end that is a lower end part of the bottom part in the standing direction of the side wall part is located on the lower side in the standing direction than the welding portion is.

20 Claims, 16 Drawing Sheets

(58) Field of Classification Search
CPC .... B65D 35/06; B65D 23/0835; B65D 19/08; B65D 7/16; B65D 7/38; B65D 7/06; B65D 7/42; B65D 15/06; B65D 15/10; B65D 15/18
See application file for complete search history.

(56) References Cited

U.S. PATENT DOCUMENTS

| | | | | |
|---|---|---|---|---|
| 4,779,751 A | * | 10/1988 | Munroe | B65D 5/448 217/69 |
| 4,813,592 A | * | 3/1989 | Stolzman | B65D 3/30 220/618 |
| 4,890,786 A | * | 1/1990 | Oberhofer | B65D 3/22 229/5.7 |
| 4,939,047 A | | 7/1990 | Nagashima | |
| 4,951,833 A | * | 8/1990 | Carpenter, Jr. | B65D 3/30 220/634 |
| 6,109,052 A | * | 8/2000 | Austin, Jr. | B65D 88/121 220/1.5 |
| 6,174,619 B1 | | 1/2001 | Yang | |
| 7,040,527 B2 | * | 5/2006 | Kasuya | B31C 1/00 229/5.5 |
| 7,584,863 B2 | * | 9/2009 | Bucher | B65D 88/121 220/1.5 |
| 8,123,061 B1 | * | 2/2012 | Brown | B65F 1/122 220/4.33 |
| 9,859,547 B2 | | 1/2018 | Nagata et al. | |
| 9,905,819 B2 | | 2/2018 | Saimaru et al. | |
| 10,103,363 B2 | | 10/2018 | Umeyama et al. | |
| 2002/0015882 A1 | | 2/2002 | Yang | |
| 2014/0113163 A1 | | 4/2014 | Nagata et al. | |
| 2016/0254501 A1 | | 9/2016 | Saimaru et al. | |
| 2016/0365546 A1 | | 12/2016 | Umeyama et al. | |

FOREIGN PATENT DOCUMENTS

| | | |
|---|---|---|
| EP | 1755818 A1 | 2/2007 |
| JP | S55-144654 A | 11/1980 |
| JP | H01-130261 U | 9/1989 |
| JP | 3057691 U | 6/1999 |
| JP | H11-219688 A | 8/1999 |
| JP | 2001-236929 A | 8/2001 |
| JP | 2002-170550 A | 6/2002 |
| JP | 2004-207333 A | 7/2004 |
| JP | 2006-19089 A | 1/2006 |
| JP | 2007-021525 A | 2/2007 |
| JP | 2011-181215 A | 9/2011 |
| JP | 2012-060052 A | 3/2012 |
| JP | 2014-038812 A | 2/2014 |
| JP | 2014-192054 A | 10/2014 |
| JP | 2015-011948 A | 1/2015 |
| JP | 2015-117610 A | 6/2015 |
| JP | 2016-045172 A | 4/2016 |
| JP | 2017-004832 A | 1/2017 |
| KR | 10-2014-0105927 A | 9/2014 |
| WO | 2005/123323 A1 | 12/2005 |
| WO | 2015/072010 A1 | 5/2015 |

OTHER PUBLICATIONS

Sep. 17, 2019 Office Action issued in Japanese Patent Application No. 2019-075133.
Nov. 10, 2020 Office Action issued in Japanese Patent Application No. 2019-075133.
Nov. 10, 2020 Second Office Action issued in Japanese Patent Application No. 2019-075133.
Apr. 5, 2021 Office Action issued in Korean Patent Application No. 10-2021-7000626.
Feb. 25, 2020 International Search Report issued in International Patent Application No. PCT/JP2020/000384.
Feb. 25, 2020 Written Opinion issued in International Patent Application No. PCT/JP2020/000384.
Feb. 4, 2020 Office Action issued in Japanese Patent Application No. 2019-075133.
Aug. 9, 2021 Office Action issued in Korean Patent Application No. 10-2021-7000626.
Aug. 26, 2021 Extended European Search Report issued in European Patent Application No. 20786687.2.
Nov. 25, 2021 Office Action issued in Chinese Patent Application No. 202080004063.8.

* cited by examiner

METAL CASE

TECHNICAL FIELD

The present invention relates to a metal case.

BACKGROUND ART

As metal cases capable of housing various articles, cases formed by drawing a metal plate with a pressing machine have been widely used heretofore. However, in some cases, so-called deep drawing cannot be performed with high accuracy on common metal materials of low ductility such as stainless, titan, etc. In addition, a drawing process is limited in a draw depth, and a drawing process performed beyond the limit of the depth causes a crack on the case, therefore, the depth of a case to be subjected to the deep drawing has been limited. Under such circumstances, Patent Document 1 discloses a configuration of a case, in which instead of a deep drawing, a tubular side wall part formed by bending a metal plate in a tubular shape and welding both ends of the metal plate together, and a plate-like bottom part formed by cutting a metal plate are prepared, and then the bottom part is welded to the tubular side wall part so as to cover an open end of the tubular side wall part, to thereby manufacture the case. As another configuration, a configuration in which a bottom part is welded to a seamless tubular member that has been formed by extrusion or pultrusion may be applicable. Because these configurations do not need a drawing process, limitation of the depth of a case can be eliminated, and variation of a wall thickness can be curtailed.

PRIOR ART LITERATURE

Patent Document

Patent Document 1
Japanese Laid-open Patent Publication 2001-236929

SUMMARY OF THE INVENTION

Problem(s) to be Solved by the Invention

However, in case in the configurations disclosed in Patent Document 1 and said other configuration, a boundary part between the bottom part and the side wall part exists on the side peripheral surface, it is necessary, during welding the both parts, to largely move a welding device along the tubular side peripheral surface in a circumferential direction, or to rotate the side wall part and the bottom part as welding targets along the tubular side peripheral surface in a circumferential direction, therefore a workability is poor. On the other hand, in case the boundary part between the bottom part and the side wall part exists on the bottom part, it is not necessary to largely move the welding device along the side peripheral surface, or to rotate the side wall part and the bottom part, therefore a workability is improved. However, weld beads that occur in an irregular shape by welding are exposed on the bottom surface and bulged from the bottom part, and thus the weld beads interfere with a placing surface when the case is placed, so that placement stability of the case deteriorates.

The present invention has been made in view of the above-mentioned background, and it is intended to provide a metal case that is satisfactory in welding workability and can be stably placed on a placing surface.

Means for Solving the Problems

One aspect of the present invention is a metal case having a bottom part composed of a metal plate, and a side wall part composed of a metal plate that stands from an outer peripheral edge of the bottom part, wherein
a boundary part between the bottom part and the side wall part includes a welding portion formed by welding the both parts together,
the welding portion is exposed on a surface of the metal case on a lower side in a standing direction of the side wall part, and
the bottom part has a lower end that is located on a lower side in the standing direction than the welding portion is.

Effects of the Invention

In the above-mentioned metal case, the welding portion included in the boundary part between the bottom part and the side wall part that stands from an outer peripheral edge is exposed on a lower surface of the metal case in the standing direction of the side wall part. However, because the bottom part has a lower end that is located lower than the welding portion in the standing direction, irregular weld beads included in the welding portion are not bulged downward from the lower end of the bottom part even if the welding portion is formed by welding from downward in the standing direction. Therefore, when the metal case is placed on a placing surface, the lower end of the bottom part contacts the placing surface, so that the weld beads of the welding portion will not contact the placing surface. Therefore, a welding workability is satisfactory, and the metal case can be placed stably.

As mentioned above, according to the present invention, a metal case that is satisfactory in welding workability and can be stably placed on the placing surface can be provided.

MODES FOR CARRYING OUT THE INVENTION

Figure 1:
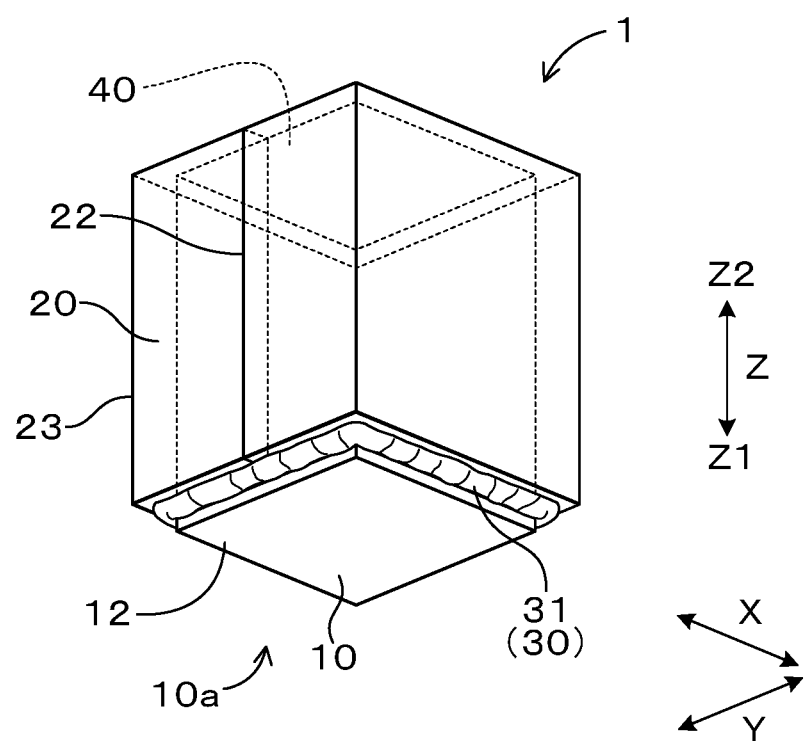
FIG. 1 is a perspective view viewed from the bottom side of a metal case according to Working Example 1.

The outer peripheral edge of the bottom part preferably has a flange portion that is located on the upper side in the standing direction than the lower end of the bottom part is, and the flange portion and the side wall part are preferably welded together to form the welding portion. In this case, the flange portion can be used as a guide for welding, so that the welding workability is improved.

The flange portion is preferably formed thinner than the central region of the bottom part. In this case, the flange portion can be easily located on the upper side than the lower end of the bottom part in the standing direction, so that forming workability of the flange portion is improved.

The flange portion preferably includes a bent portion that is bent toward the upper side in the standing direction and is bent toward the outer side in a plan view of the bottom part. In this case, the flange portion can be located on the upper side than the lower end of the bottom part in the standing direction with a simple configuration, and a moldability of the flange portion is improved.

The lower end is preferably located on the lower side in the standing direction of the side wall part within a range of 0.2-5.0 mm than the welding portion is. In this case, when the metal case is placed, weld beads of the welding portion do not contact a placing surface, and the bottom part of the metal case can be prevented from excessively increasing in thickness in the standing direction.

The lower end of the bottom part is preferably formed of a protruding part that protrudes to the lower side in the standing direction. In this case, the protruding part serving as the lower end of the bottom part surely abuts on the placing surface when the metal case is placed on a placing surface, and thus the welding portion can be surely prevented from abutting on the placing surface, so that placement stability of the metal case can be further improved.

The bottom part preferably has an inner periphery contacting part that abuts on an inner peripheral surface of the side wall part. In this case, when the bottom part is welded to the side wall part, positioning of the bottom part can be easily made, so that welding workability is improved.

Working Example 1

A working example of the above-mentioned metal case is explained with reference to FIG. 1 to FIG. 5.

A metal case 1 of the present working example has a bottom part 10 composed of a metal plate, and a side wall part 20 composed of a metal plate that stands from an outer peripheral edge 11 of the bottom part 10.

A boundary part 30 between the bottom part 10 and the side wall part 20 includes a welding portion 31 formed by welding the both parts together.

The welding portion 31 is exposed on a surface 10a of the metal case 1 on the lower side Z1 in a standing direction of the side wall part 20.

Figure 2:
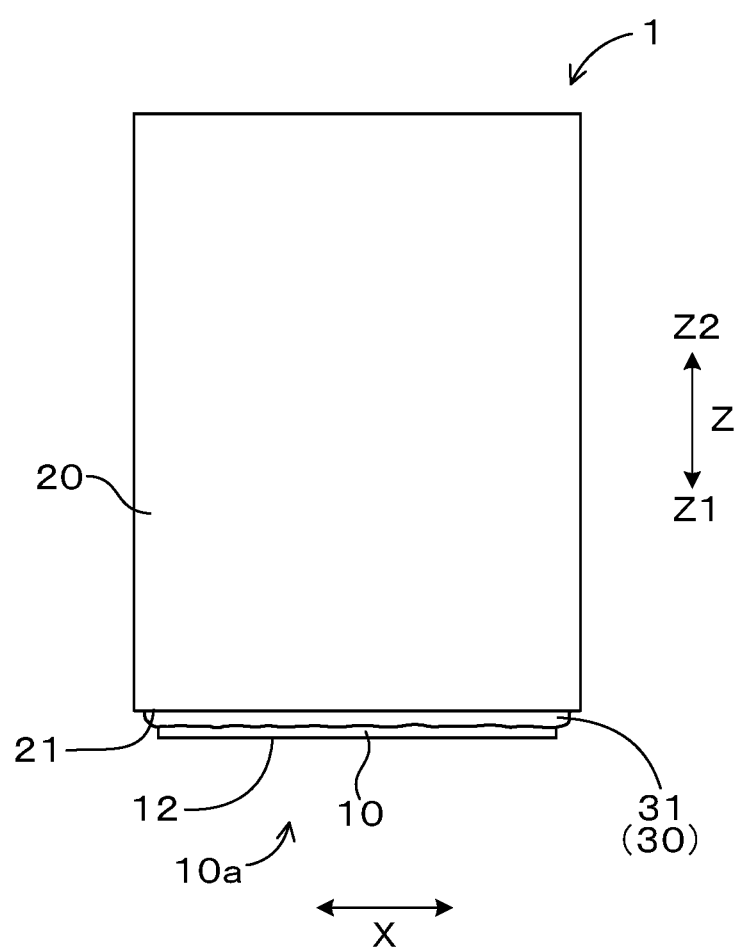
FIG. 2 is a side view of the metal case according to Working Example 1.

As shown in FIG. 2, a lower end 12 that is an end of the bottom part 10 on the lower side Z1 in the standing direction of the side wall part 20 is located on the lower side Z1 than the welding portion 31 in the standing direction.

Hereinafter, the metal case 1 of the present working example will be described in detail.

A material for molding the metal case 1 of the present working example is a metal material, and can be selected appropriately in consideration of the properties of an item(s) to be housed, a use environment of the metal case 1, a moldability of a molding material, etc. For example, in the case where the metal case is used as a case for a battery, stainless steel, steel, titanium, a titanium alloy, aluminum, an aluminum alloy, etc. can be used in consideration of corrosion resistance, weldability, etc.

The metal case 1 has no particular limitation on its outer shape, and the bottom part 10 may be formed in a rectangle, a circle, an ellipse, a quadrilateral shape with two longer sides and two circular arc short sides, a corner-rounded rectangle, etc. The side wall part 20 is formed to stand on the outer peripheral edge of the bottom part 10.

Figure 3:
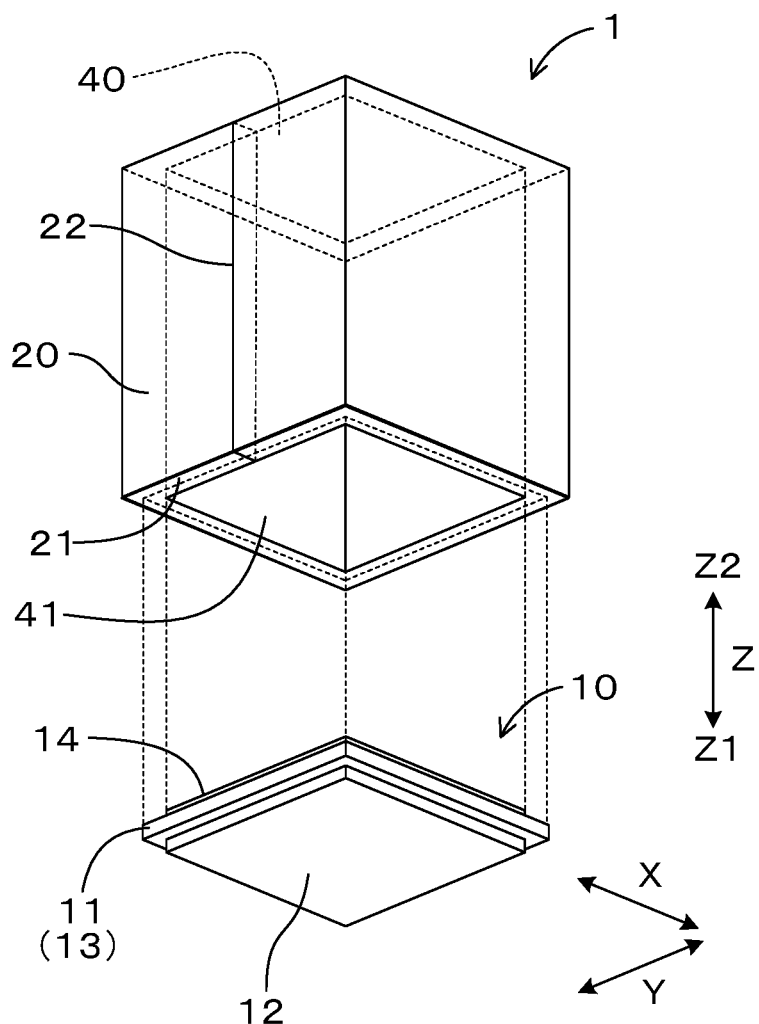
FIG. 3 is an exploded perspective view viewed from the bottom side of the metal case before welded, according to Working Example 1.

In the present example, the metal case 1 has an almost rectangular parallelopiped shape as shown in FIG. 1, and has the bottom part 10 and the side wall part 20. The opposite side to the bottom part 10 is open to form an opening 40. In the present example, the bottom part 10 and the side wall part 20, which have been separately molded as shown in FIG. 3, are welded to form one united body. The bottom part 10 is formed into an almost tabular shape and in a rectangle in a plan view. Among surface directions of the bottom part 10, a direction that is parallel to one side of the bottom part 10 is defined as a width direction X, and a direction that is orthogonal to the width direction X is defined as a depth direction Y. The side wall part 20 is formed in a tubular shape having a bottom that forms a rectangular outline, and stands from each side of the bottom part 10. The standing direction Z of the side wall part 20 is a direction orthogonal to the width direction X and the depth direction Y.

In the present example, as shown in FIG. 3, the side wall part 20 is formed by bending a metal plate into a tubular shape and welding the ends together in an abutting state. In this way, a side wall weld portion 22 is formed. In the present example, the side wall weld portion 22 is configured so as not to locate at corners 23. A side-wall lower end 21 of the side wall part 20 forms a lower-end opening 41 that opens in a square shape.

Figure 4A:
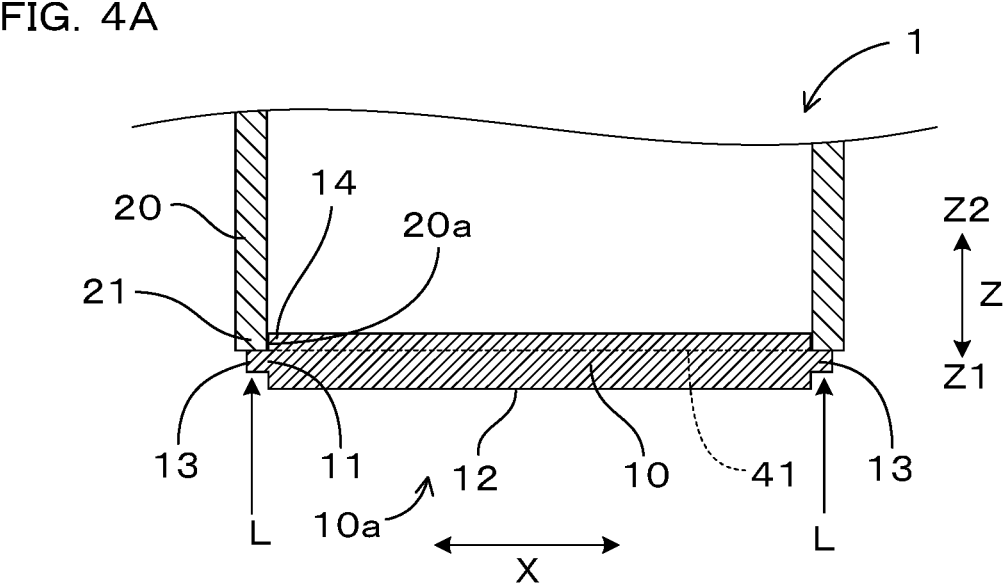
FIG. 4A is a sectional view of the metal case before welded, according to Working Example 1.
Figure 5A:
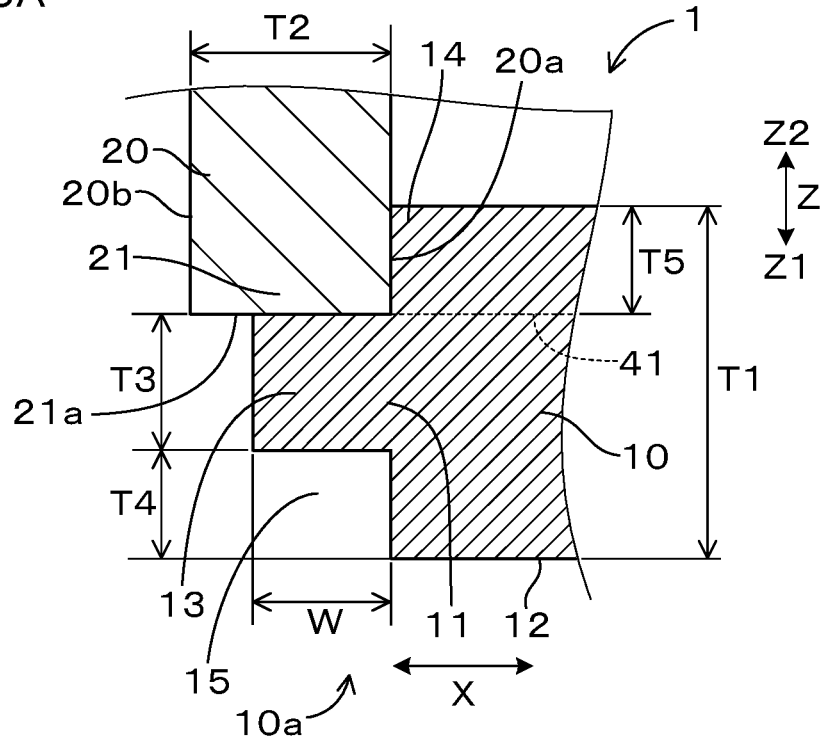
FIG. 5A is a partly enlarged view of FIG. 4A, according to Working Example 1.

As shown in FIG. 3, the bottom part 10 has the flange portion 13 provided on the outer peripheral edge 11 thereof. The flange portion 13 protrudes from the outer peripheral edge 11 of the bottom part 10 outwardly in the surface direction of the bottom part 10. The way to form the flange portion 13 on the outer peripheral edge 11 of the bottom part 10 is not particularly limited, and a press working, a cutting work, etc. can be used. And, as shown in FIG. 5A, the bottom part 10 is put on the side-wall lower end 21 of the side wall part 20 such that the flange portion 13 abuts on the lower end surface 21a of the side-wall lower end 21, which is a lower end of the side wall part 20, and then, as shown in FIG. 4A, a laser beam is applied toward the upper side Z2 from the lower side in the standing direction Z in the figure as shown by an arrow L, so that the flange portion 13 and the side wall portion 21 are welded together to form the welding portion 31. The laser beam is not necessarily applied in a direction that is parallel to the standing direction Z, and may be applied in a direction set to the flange portion 13 obliquely from below the metal case 1. It is noted that although each figure illustrates that a direction of laser irradiation is set upward from the downside of the figure, the laser beam is applied in an inverted direction of the aforesaid direction in practice, i.e., a direction directed from up to down in the gravitational direction. The welding measure is not limited, and TIG welding may be used in place of laser welding.

Figure 4B:
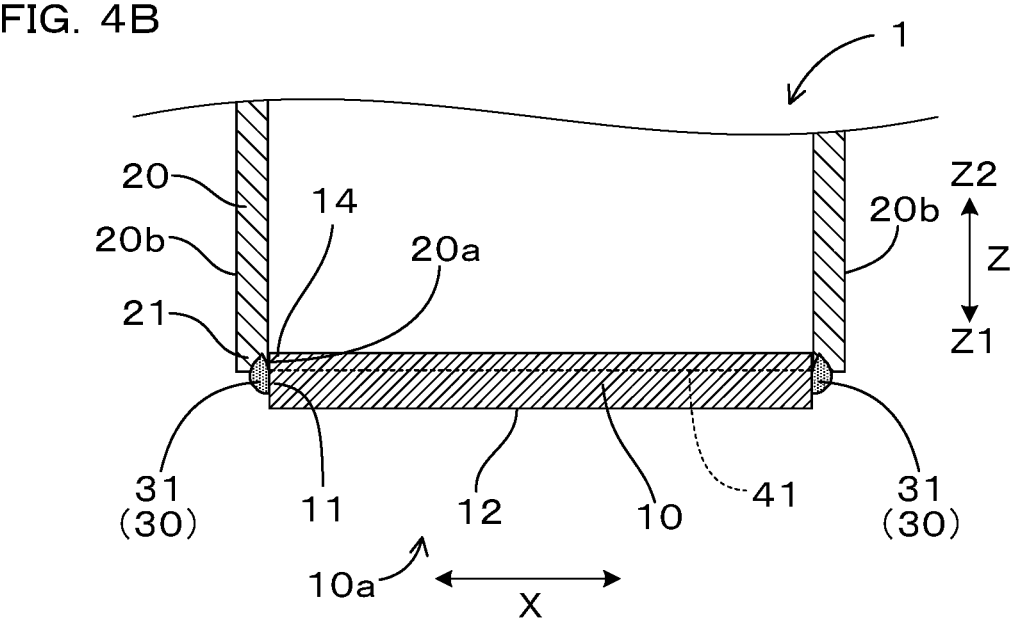
FIG. 4B is a sectional view of the metal case after welded, according to Working Example 1.

As shown in FIG. 4B, the welding portion 31 is exposed on the surface 10a of the metal case 1 on the lower side Z1 in the standing direction of the metal case 1. In the present example, a whole of the boundary part 30 constitutes the welding portion 31. The welding portion 31 is formed of weld beads, which has been formed over the entire circumference along the outer periphery of the bottom part 10 as shown in FIG. 1, and produces an irregular configuration as a whole. In the present example, as shown in FIG. 4B, the welding portion 31 is located inside of an outer peripheral surface 20b of the side wall part 20 in the width direction X.

Figure 5B:
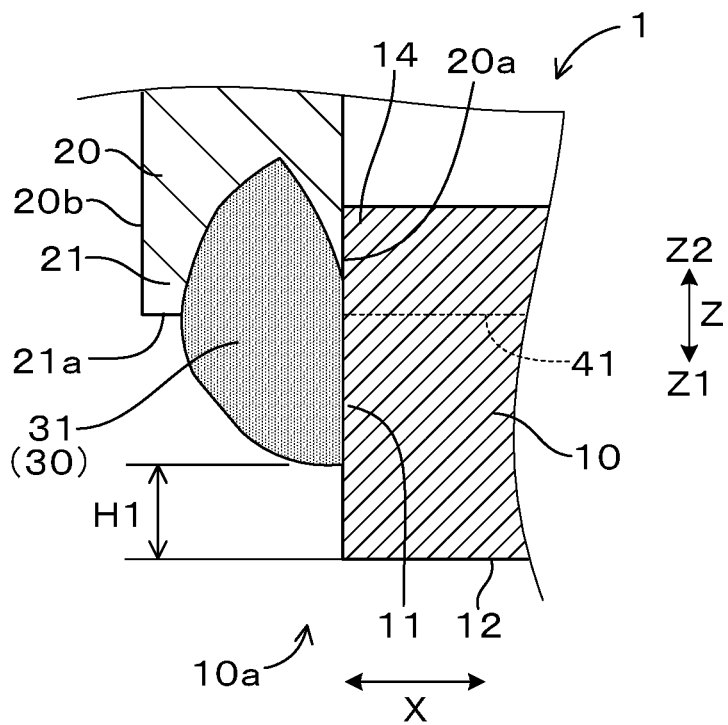
FIG. 5B is a partly enlarged view of FIG. 4B, according to Working Example 1.

As shown in FIG. 5B, the lower end 12 is located on the lower side Z1 in the standing direction Z by a height H1 than the welding portion 31 is. The height H1 may be set, for example, within 0.2-5.0 mm, and it is set within 0.2-1.0 mm in the present example.

As shown in FIG. 4A, the bottom part 10 is set into the lower-end opening 41 of the side wall part 20 to produce an inner periphery contacting part 14. The inner periphery contacting part 14 is configured to abut on at least a pair of surfaces in an inner peripheral surface 20a which are opposed to each other, and in the present example, the inner periphery contacting part 14 abuts on all of four surfaces in the inner peripheral surface 20a.

Although the thickness of a metal material for forming the metal case 1 is not particularly limited, it may be set to approximately 0.1-2.0 mm. In the present example, as shown in FIG. 5A, a thickness T1 of the bottom part 10 is 1.5 mm, and a thickness T2 of the side wall part 20 is 1.0 mm. A thickness T3 of the flange portion 13 may be set to 0.5 mm or more and less than the thickness T1 of the bottom part 10, and in the present example, the thickness T3 is 0.5 mm. In other words, the flange portion 13 is formed thinner than the central region of the bottom part 10. A width W of the flange portion 13, which is a length W in the width direction X of a stepped portion 15 stepped between the lower end 12 and the flange portion 13, may be set to 0.5 mm or more, and less than the thickness T2 of the side wall part 20, and in the present example, the width W is 0.8 mm.

In addition, as shown in FIG. 5A, a distance T4 in the standing direction Z between the lower end 12 and the flange portion 13, which is a depth T4 of the stepped portion 15 stepped between the lower end 12 and the flange portion 13, may be set to 0.5 mm or more and less than the thickness T1 of the bottom part 10, and in the present example, the thickness T3 is 0.5 mm. A thickness T5 of the inner periphery contacting part 14 from the flange portion 13 in the standing direction Z may be set to 0.5 mm or more, and less than the thickness T1 of the bottom part 10, and in the present example, the thickness T5 is 0.5 mm.

Operational effects of the metal case 1 of the present example are described.

With regard to the metal case 1 of the present example, the welding portion 31, which is included in the boundary part 30 between the bottom part 10 and the side wall part 20 that stands from the outer peripheral edge 11 of the bottom part 10, is exposed on the surface 10a on the lower side Z1 in the standing direction of the side wall part 20. However, because the bottom part 10 has the lower end 12 that is located on the lower side Z1 in the standing direction than the welding portion 31 is, irregular weld beads included in the welding portion 31 are not bulged to the lower side Z1 in the standing direction from the lower end 12 of the bottom part 10 even if the welding portion 31 is formed by welding from the lower side Z1 in the standing direction. Therefore, when the metal case 1 is placed on a placing surface, the lower end 12 of the bottom part 10 abuts on the placing surface, so that the weld beads of the welding portion 13 do not contact the placing surface. Consequently, welding workability is satisfactory, and the metal case 1 can be placed stably.

Moreover, in the present example, the outer peripheral edge 11 of the bottom part 10 has the flange portion 13, which is located on the upper side Z2 in the standing direction than the lower end 12 of the bottom part 10 is, and the flange portion 13 and the side wall part 20 are welded together to form the welding portion 31. Consequently, the flange portion 13 can be used as a guide for welding, and the welding workability is improved.

Furthermore, in the present example, the flange portion 13 is formed having the outer peripheral edge 11 of the bottom part 10 made thinner than the central region of the bottom part 10. Consequently, it becomes easy to locate the flange portion 13 on the upper side Z2 in the standing direction than the lower end 12 of the bottom part 10 is, so that forming workability of the flange portion 13 is improved.

Furthermore, in the present example, the lower end 12 is located on the lower side Z1 in the standing direction Z of the side wall part 20 within a range of 0.2-5.0 mm than the welding portion 31 is. Consequently, when the metal case 1 is placed, weld beads of the welding portion 31 do not contact a placing surface, and the bottom part 10 of the metal case 1 can be prevented from excessively increasing in thickness in the standing direction Z.

Furthermore, in the present example, the bottom part 10 has the inner periphery contacting part 14 that abuts on the inner peripheral surface 20a of the side wall part 20. Consequently, when the bottom part 10 is welded to the side wall part 20, positioning of the bottom part 10 can be easily made, so that welding workability is improved.

Figure 6A:
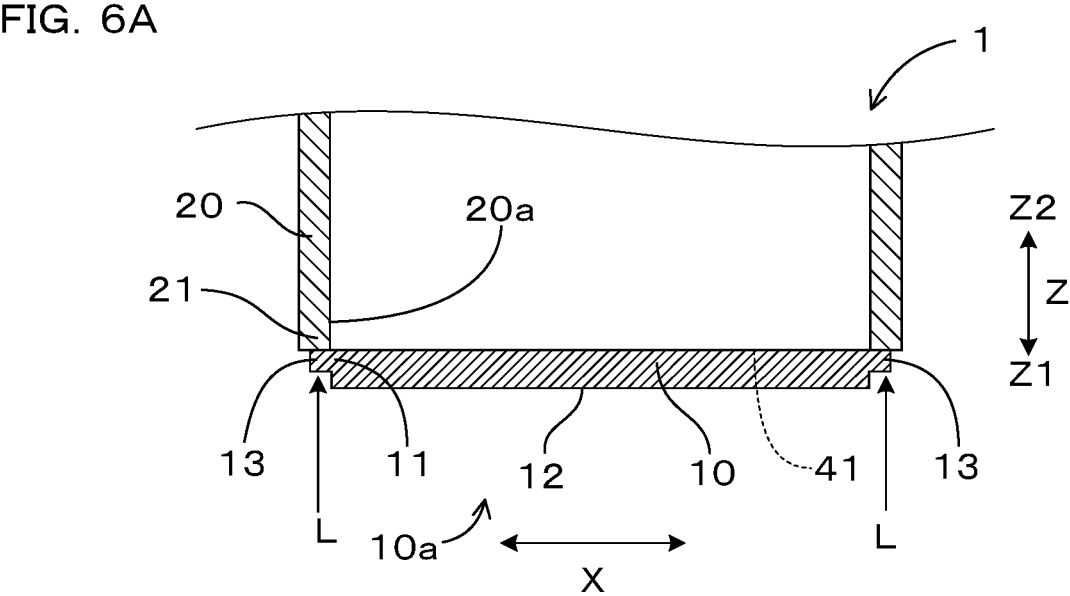
FIG. 6A is a sectional view of a metal case before welded, according to Modification 1.
Figure 6B:
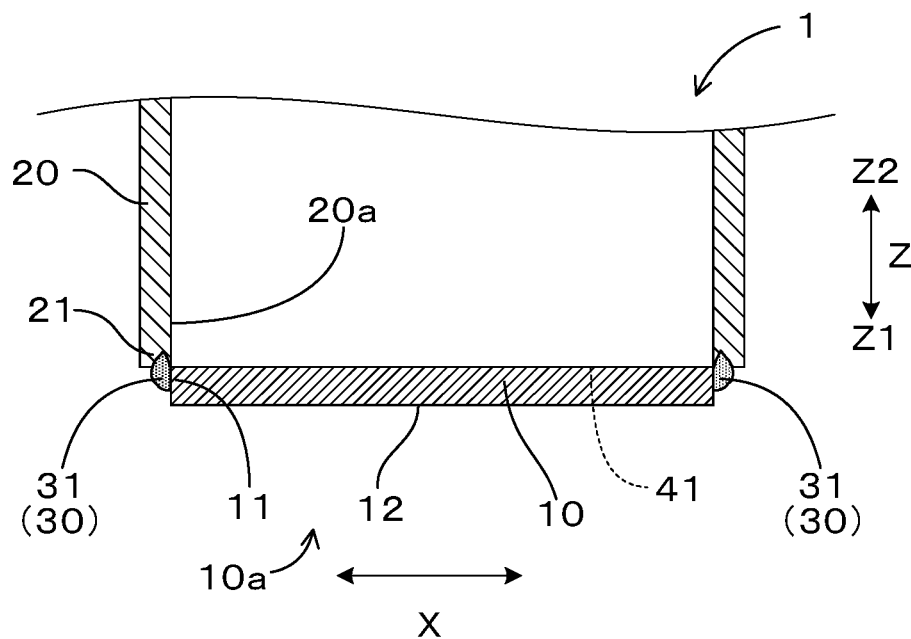
FIG. 6B is a sectional view of the metal case after welded, according to Modification 1.

It is noted that although in the present example, the bottom part 10 has the inner periphery contacting part 14, the bottom part 10 may be configured so as not to have the inner periphery contacting part 14 instead, as in Modification 1 shown in FIG. 6A and FIG. 6B.

Figure 7A:
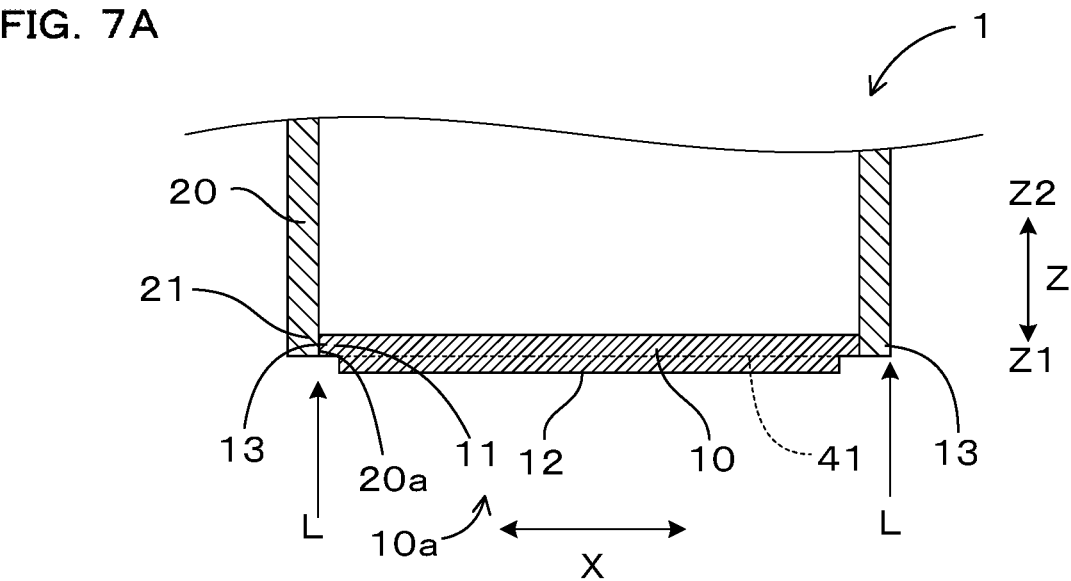
FIG. 7A is a sectional view of a metal case before welded, according to Modification 2.
Figure 7B:
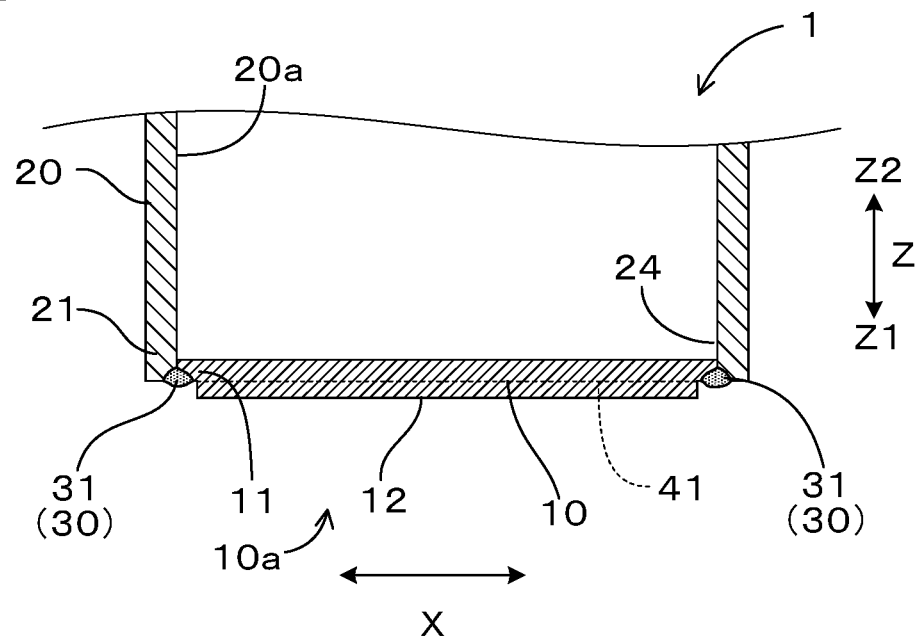
FIG. 7B is a sectional view of the metal case after welded, according to Modification 2.

It is noted that although in the present example, the flange portion 13 is configured to abut on a lower end surface 21a of the side-wall lower end 21 of the side wall part 20, in place of this configuration, it may be configured such that part of the bottom part 10 is set into the lower-end opening 41 of the side wall part 20 so that the flange portion 13 abuts on the inner peripheral surface 20a of the side wall part 20 as in Modification 2 shown in FIG. 7A and FIG. 7B.

Figure 8A:
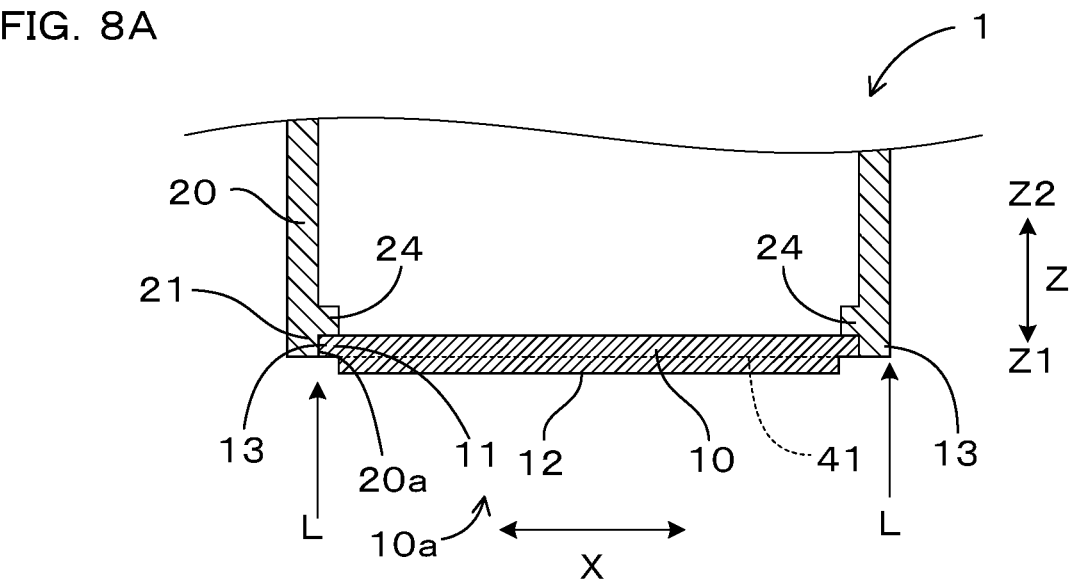
FIG. 8A is a sectional view of a metal case before welded, according to Modification 3.
Figure 8B:
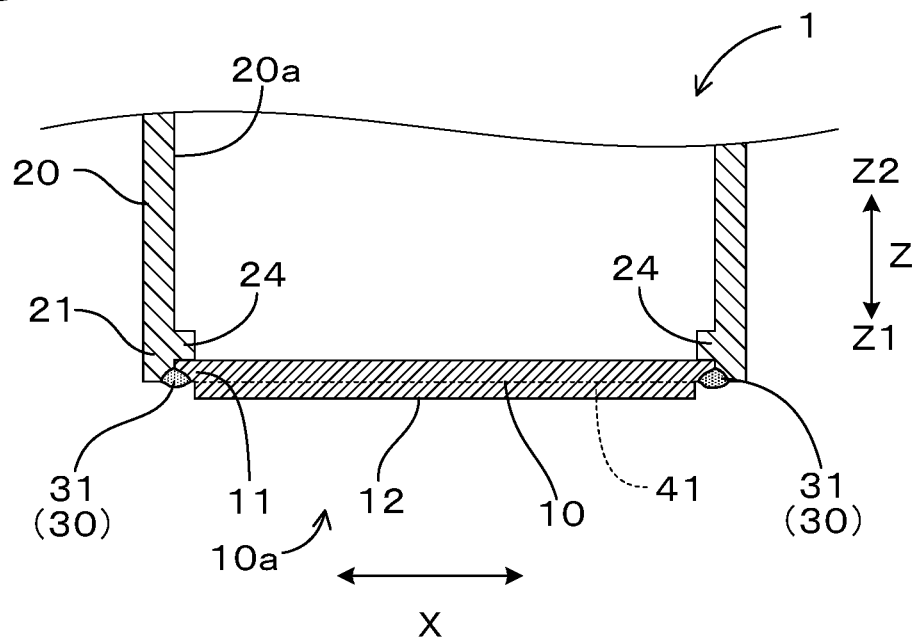
FIG. 8B is a sectional view of the metal case after welded, according to Modification 3.

In Modification 3 as another modification, a protrusion 24 may be protrudingly formed on the inner peripheral surface 20a of the side wall part 20 near the lower-end opening 41 in the configuration of Modification 2, as shown in FIG. 8A and FIG. 8B. According to Modification 3, the flange portion 13 is allowed to abut on the protrusion 24, and positioning of the bottom part 10 in the standing direction Z can be made easily.

Figure 9A:
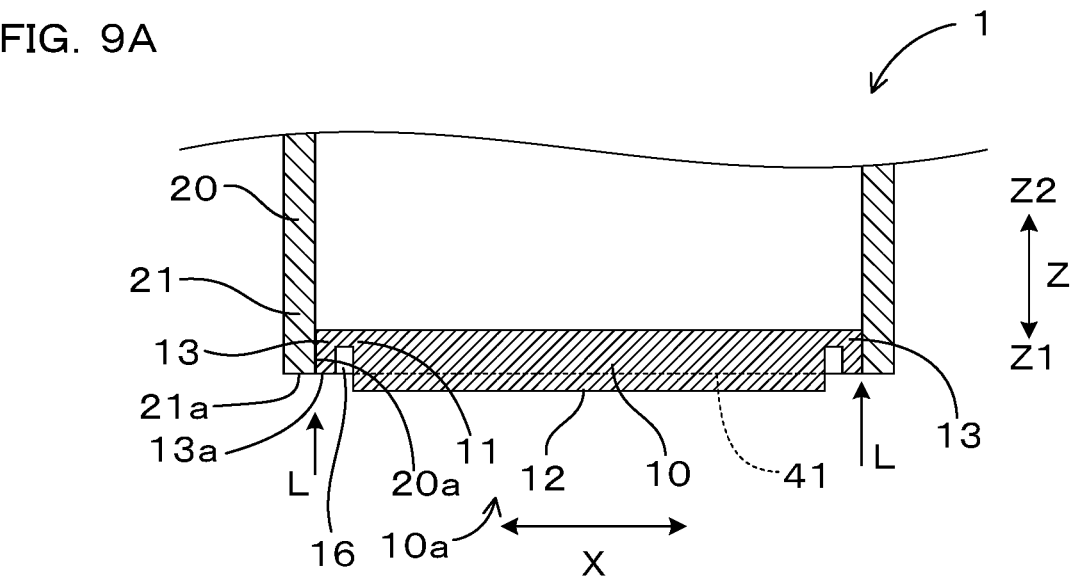
FIG. 9A is a sectional view of a metal case before welded, according to Modification 4.
Figure 9B:
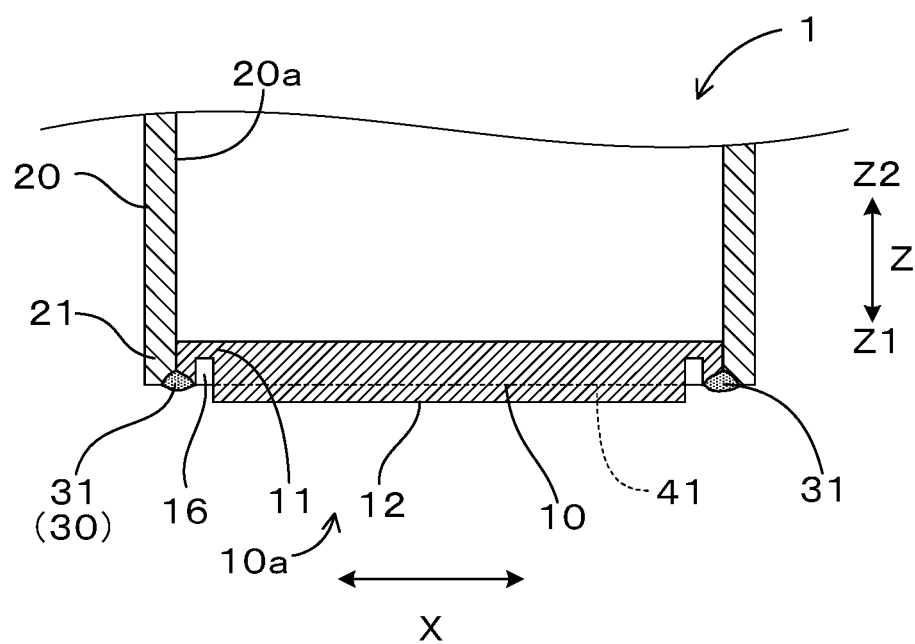
FIG. 9B is a sectional view of the metal case after welded, according to Modification 4.
Figure 10A:
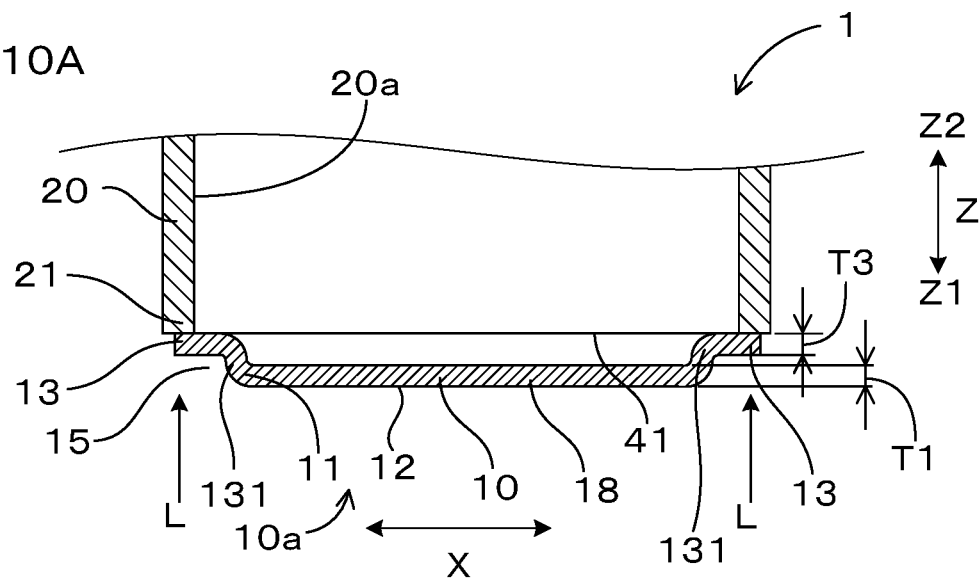
FIG. 10A is a sectional view of a metal case before welded, according to Working Example 2.
Figure 10B:
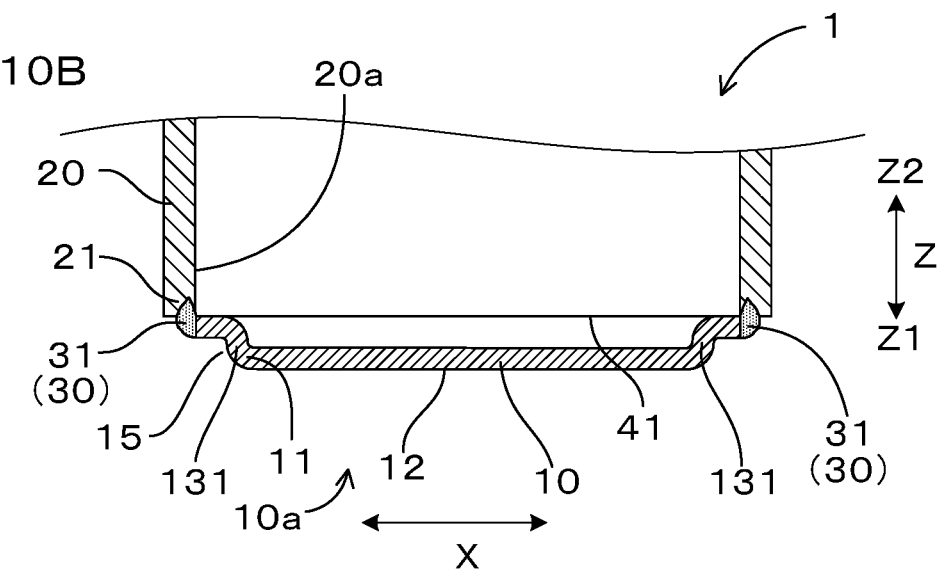
FIG. 10B is a sectional view of a metal case after welded, according to Working Example 2.

Modification 4 as another modification may be configured such that a front edge of the flange portion 13 is bent toward the lower side Z1 in the standing direction, as shown in FIG. 9A and FIG. 9B. In this Modification 4, a recessed part 16 is formed in the flange portion 13 on the inner side of its front edge, and welding is performed in the state that a tip surface 13a of the flange portion 13 and the lower end surface 21a of the side wall part 20 are set on the same plane. It is noted that also in Modification 4, the protrusion 24 may be protrudingly formed in the same manner as in Modification 3 shown in FIG. 8A and FIG. 8B.

As mentioned above, according to Working Example 1 and Modifications 1 to 4, the metal case 1 that is satisfactory in welding workability and can be stably placed on a placing surface can be provided.

Working Example 2

In the metal case 1 of the present example, the thickness T1 of the central region 18 and the thickness T3 of the flange portion 13 in the bottom part 10 are made the same, and are set to 1.0 mm. With regard to the bottom part 10, the flange portion 13 is formed by performing a press working on a metal plate to bend the outer peripheral edge 11 upward Z2 in the standing direction and produce the stepped portion 15. In this way, the flange portion 13 is provided with a bent portion 131 that is bent toward the upper side Z2 in the standing direction, and is bent in either one of the width direction X or the depth direction Y, i.e., an outward direction in a plan view of the bottom part 10. It is noted that in the present example, the same reference numbers are used for the same configurations as those in Working Example 1 to omit the explanation.

In the metal case 1 of the present example, the flange portion 13 can be located on the upper side Z2 in the standing direction than the lower end 12 of the bottom part 10 is, with a simple configuration because it has the bent portion 131, so that moldability of the flange portion 13 is improved. In addition, the present example also exhibits the same operational effects as those in Working Example 1.

Figure 11A:
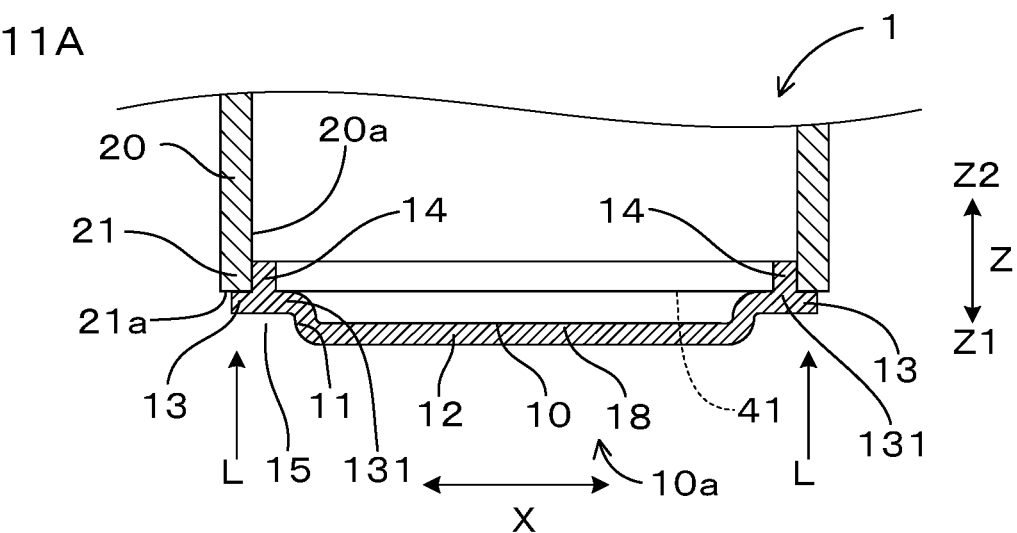
FIG. 11A is a sectional view of a metal case before welded, according to Modification 5.
Figure 11B:
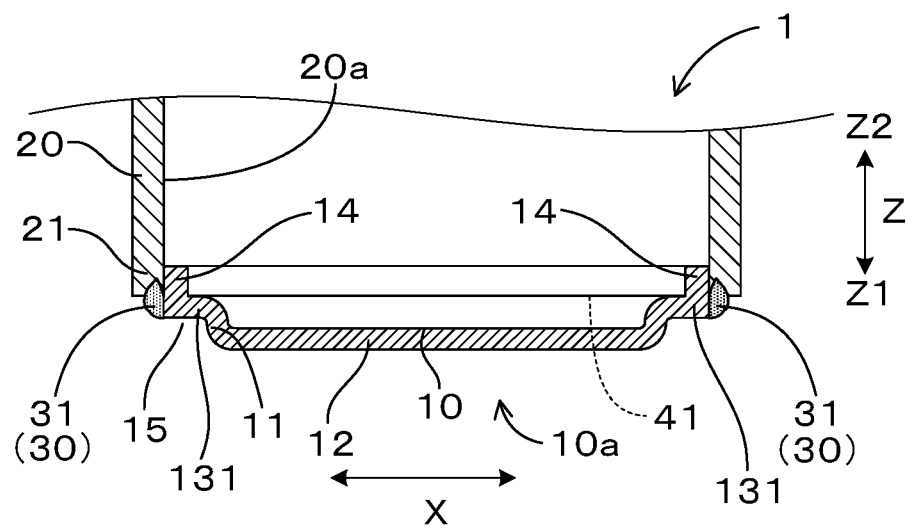
FIG. 11B is a sectional view of the metal case after welded, according to Modification 5.

It is noted that the inner periphery contacting part 14 that abuts on the inner peripheral surface 20a of the side wall part 20 may be provided to the bottom part 10 in the configuration of Working Example 2, as in Modification 5 shown in FIG. 11A and FIG. 11B. The inner periphery contacting part 14 may be configured in the same way as in Working Example 1.

Figure 12A:
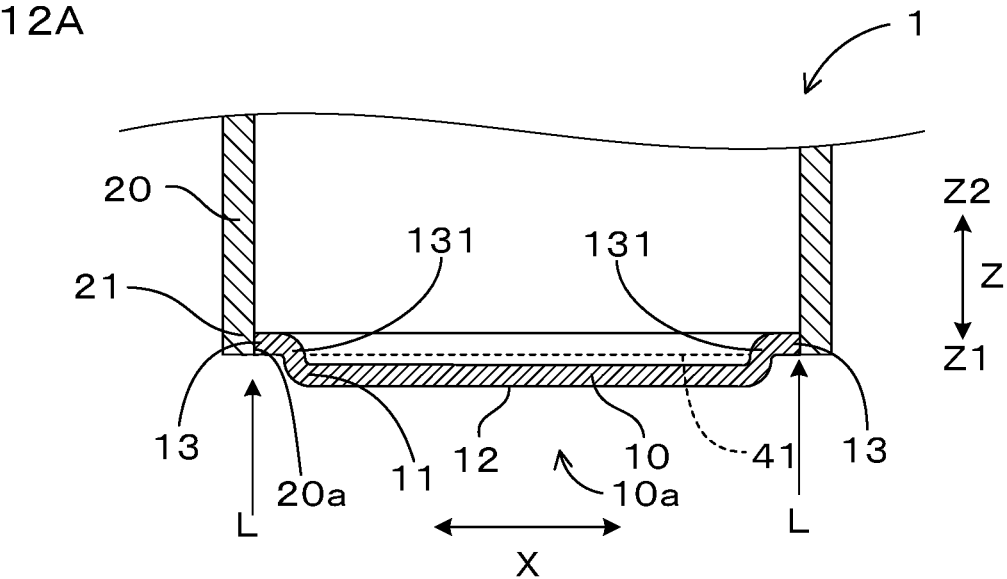
FIG. 12A is a sectional view of a metal case before welded, according to Modification 6.
Figure 12B:
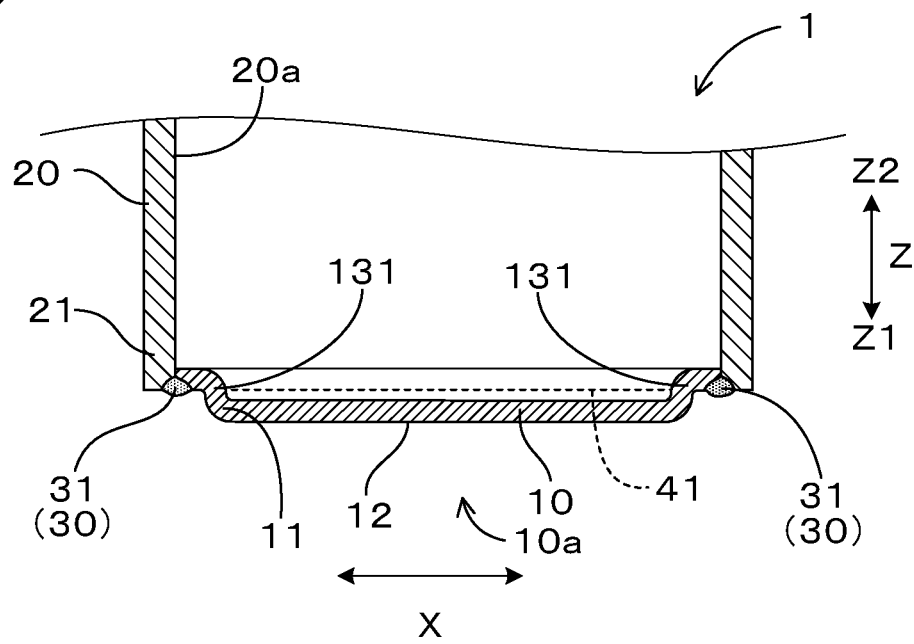
FIG. 12B is a sectional view of the metal case after welded, according to Modification 6.

In addition, another configuration as in Modification 6 shown in FIG. 12A and FIG. 12B may be applied, in which part of the bottom part 10 is set into the lower-end opening 41 of the side wall part 20 so that the flange portion 13 abuts on the inner peripheral surface 20a of the side wall part 20.

Figure 13A:
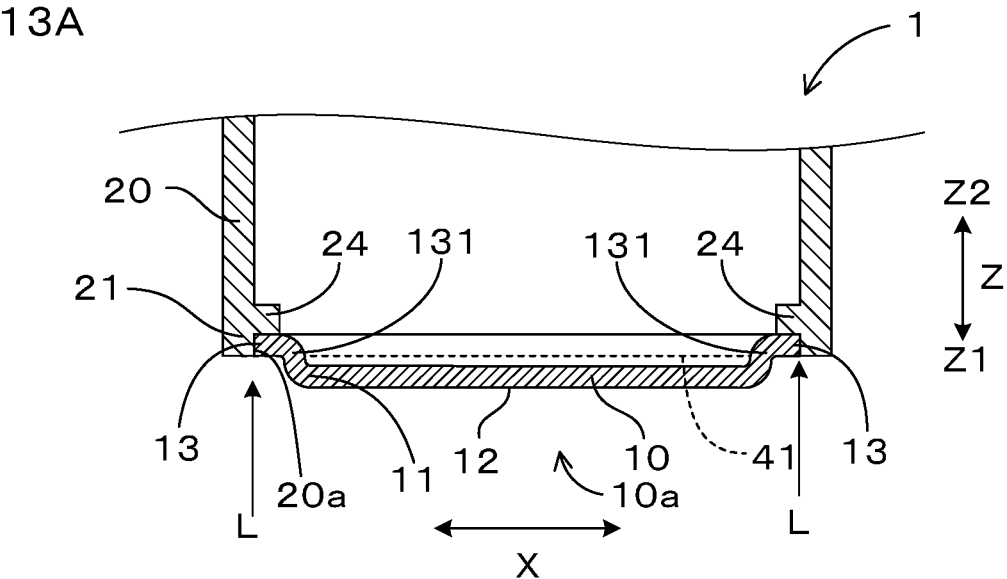
FIG. 13A is a sectional view of a metal case before welded, according to Modification 7.
Figure 13B:
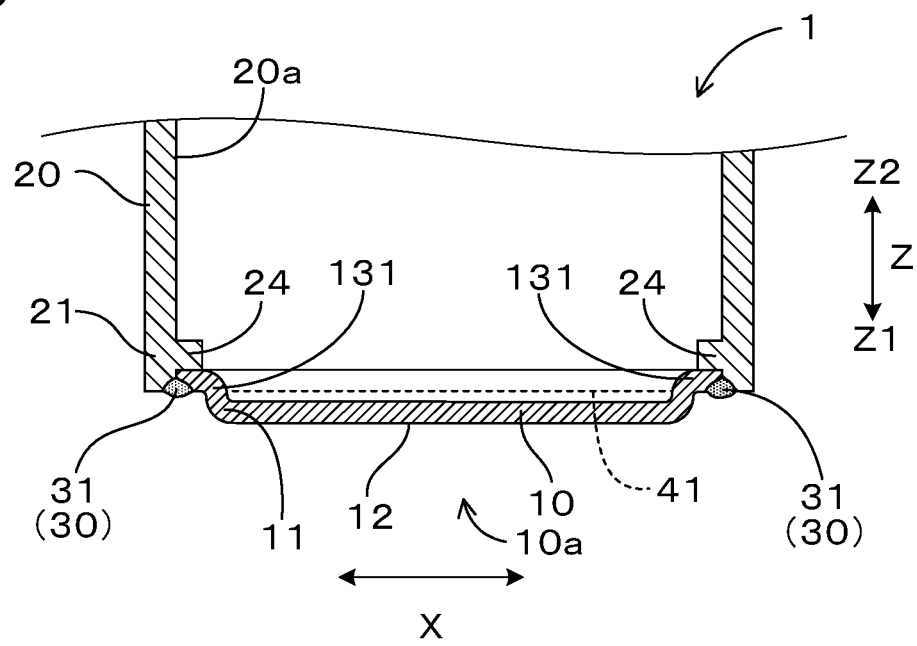
FIG. 13B is a sectional view of a metal case after welded, according to Modification 7.

Moreover, in Modification 7 as another modification, the protrusion 24 may be protrudingly formed on the inner peripheral surface 20a of the side wall part 20 near the lower-end opening 41 in the configuration of Modification 6, as shown in FIG. 13A and FIG. 13B. According to this Modification 7, because the flange portion 13 is allowed to abut on the protrusion 24, positioning of the bottom part 10 in the standing direction Z can be made easily.

Figure 14A:
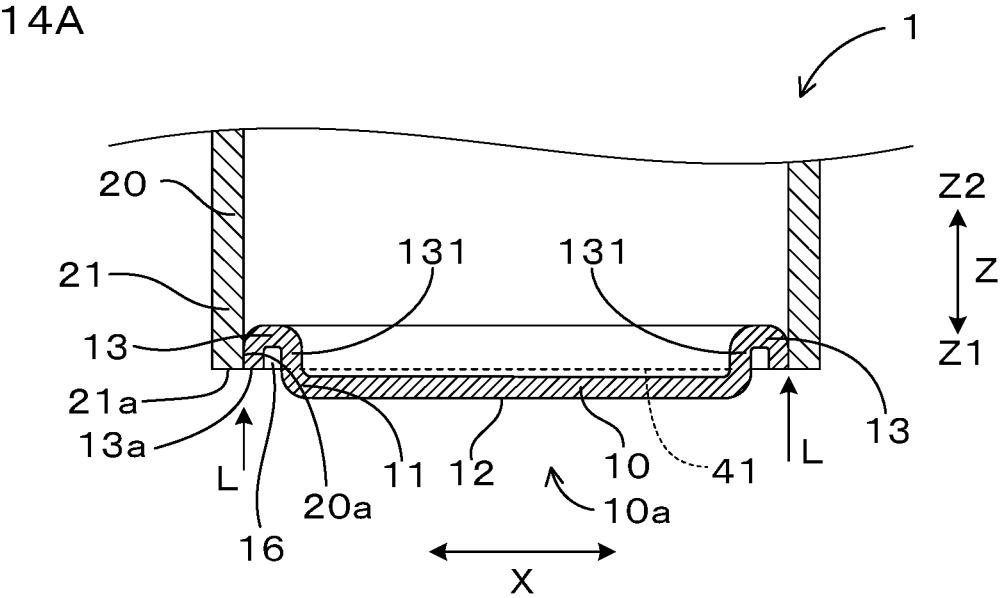
FIG. 14A is a sectional view of a metal case before welded, according to Modification 8.
Figure 14B:
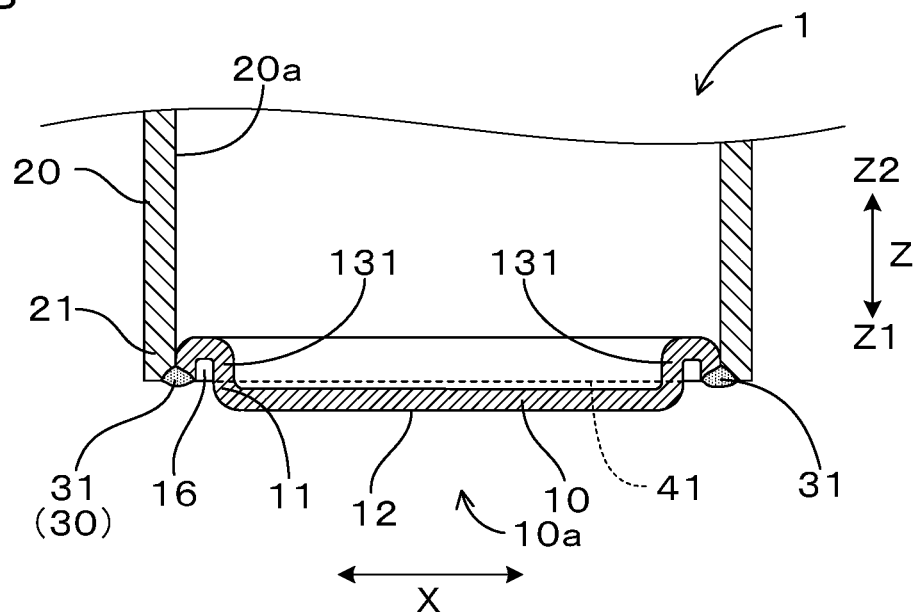
FIG. 14B is a sectional view of the metal case after welded, according to Modification 8.

Furthermore, Modification 8 may be configured such that a front edge of the flange portion 13 in the configuration of Working Example 2 is bent toward the lower side Z1 in the standing direction, as shown in FIG. 14A and FIG. 14B. In this Modification 8, the recessed part 16 is formed in the flange portion 13 on the inner side of its front edge, and welding is performed in the state that the tip surface 13a of the flange portion 13 and the lower end surface 21a of the side wall part 20 are set on the same plane. It is noted that also in Modification 8, the protrusion 24 may be protrudingly formed in the same manner as in Modification 7 shown in FIG. 13A and FIG. 13B.

Figure 15A:
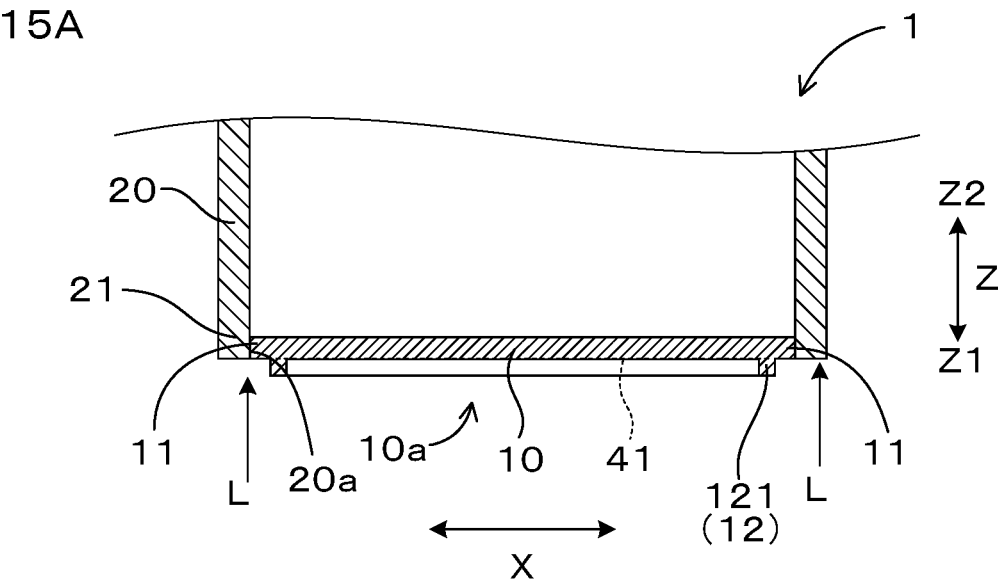
FIG. 15A is a sectional view of a metal case before welded, according to Modification 9.
Figure 15B:
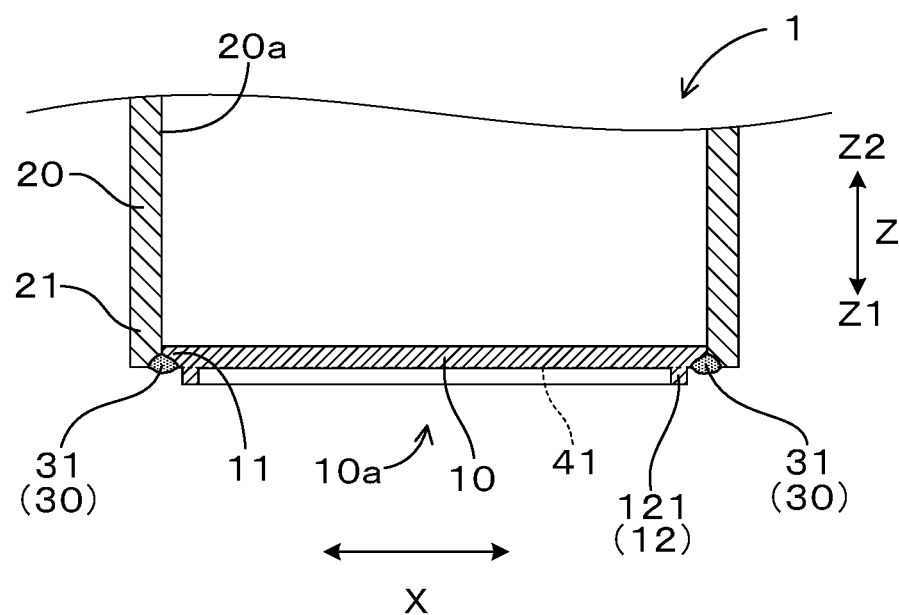
FIG. 15B is a sectional view of the metal case after welded, according to Modification 9.

Still furthermore, in Modification 9 as another modification, the bottom part 10 may be formed in a plate-like shape, and may be provided with the protruding part 121 that protrudes downward Z1 from the bottom part 10 in the standing direction to serve as the lower end 12 of the bottom part 10, as shown in FIG. 15A and FIG. 15B. In the present example, the protruding part 121 is formed on the bottom part 10 on the inner side of the outer peripheral edge 11 along the outer peripheral edge 11 over the entire periphery. The height of the protruding part 121 is not particularly limited, and may be set, for example, within a range of 0.5-2.0 mm. The bottom part 10 and the side wall part 20 are welded together from below the bottom part 10 in an upward direction Z2 in the state that an end face 11a of the outer peripheral edge 11 of the bottom part 10 is in contact with the inner peripheral surface 20a of the side wall part 20. It is noted that the protruding part 121 is not necessarily formed over the entire periphery, and may be provided at four corners of the bottom part 10. In addition, also in Modification 9, the protrusion 24 may be protrudingly formed in the same manner as in Modification 7 shown in FIG. 13A and FIG. 13B.

In the metal case 1 of Modification 9, the lower end 12 of the bottom part 10 is formed of the protruding part 121 that protrudes to the lower side Z1 in the standing direction. Consequently, when the metal case 1 is placed on a placing surface, the protruding part 121 serving as the lower end 12 of the bottom part 10 is reliably in contact with the placing surface, and thus the welding portion 31 can be surely prevented from abutting on the placing surface, so that placement stability of the metal case 1 can be further improved.

As with Working Example 1, also in accordance with Working Example 2 and Modifications 5 to 9, the metal case 1 that is satisfactory in welding workability and can be stably placed on a placing surface can be provided.

Working Example 3

Figure 16A:
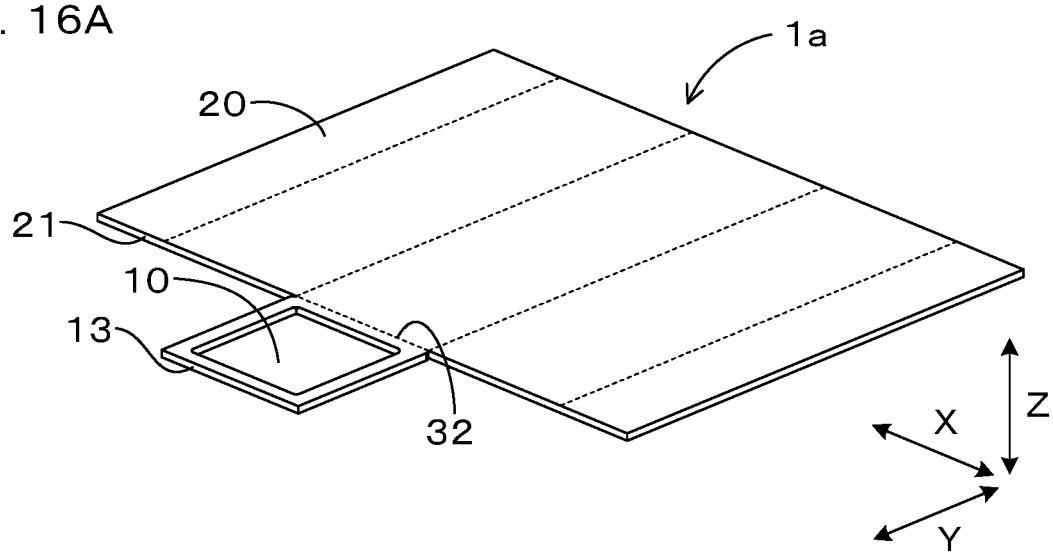
FIG. 16A is a perspective view of an expanded body of a metal case, according to Working Example 3.
Figure 16B:
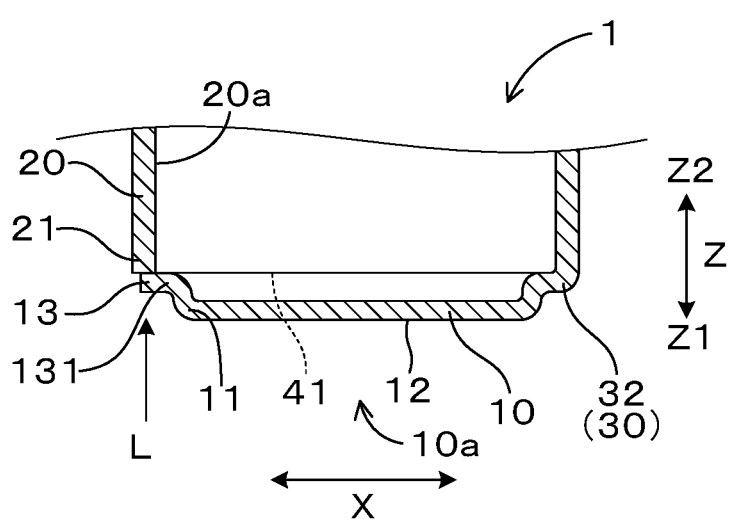
FIG. 16B is a sectional view of the metal case before welded, according to Working Example 3.

In addition, although in Working Example 2, the bottom part 10 and the side wall part 20 are prepared separately and are joined together by welding, in place of this configuration, Working Example 3 is configured such that an extended body 1a of a metal case before welded includes the bottom part 10 and the side wall part 20 that are continuously formed of one metal plate, and one side of the bottom part 10 is continuous with the side wall part 20 through a bending portion 32, as shown in FIG. 16A. And, as shown in FIG. 16B, the bottom part 10 is bent at the bending portion 32 with the flange portion 13 being laid on the side-wall lower end 21 of the side wall part 20, and to which a laser beam is applied in a direction as shown by an arrow L, so that the bottom part 10 and the side wall part 20 are welded to form the welding portion 31, as shown in FIG. 16(c).

Figure 16C:
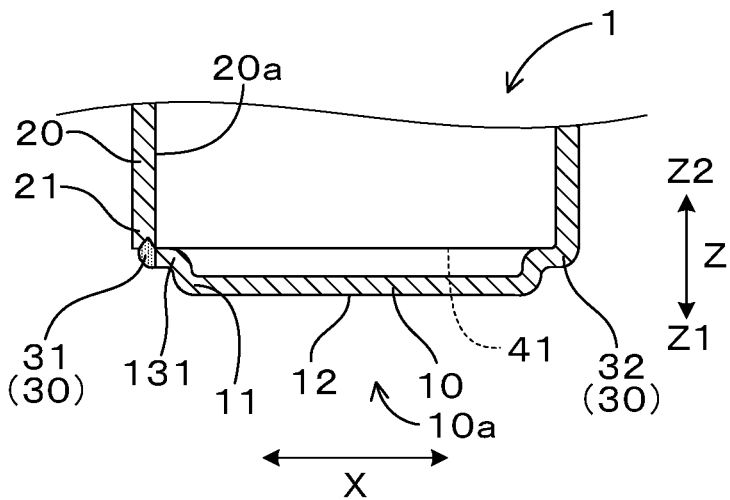
FIG. 16C is a sectional view of the metal case after welded, according to Working Example 3.

As shown in FIG. 16(c), in the metal case 1 of the present example, the boundary part 30 between the bottom part 10 and the side wall part 20 includes the welding portion 31 and the bending portion 32. The welding portion 31 of the boundary portion 30 is located on the upper side Z2 in the standing direction than the lower end 12 of the bottom part 10 is, and thus, the same operational effects as those in Working Examples 1 and 2 are exhibited.

The present invention is not limited to the above-mentioned working examples and modifications, and can be applied to various embodiments within a range that does not depart from the gist of the present invention.

The invention claimed is:

1. A metal case comprising:
a bottom part composed of a metal plate, and
a side wall part composed of a metal plate that stands from an outer peripheral edge of the bottom part, wherein:
a boundary part between the bottom part and the side wall part includes a welding portion formed by welding the bottom part and the side wall part together,
the welding portion is exposed on a surface of the metal case on a lower side in a standing direction of the side wall part,
the bottom part has a lower end that is located on a lower side of the welding portion in the standing direction, and
the side wall part extends from an outer peripheral surface to an inner peripheral surface in a width direction of the metal case orthogonal to the standing direction, the welding portion is located inside of the outer peripheral surface of the side wall part in the width direction, and the lower end of the bottom part extends in the width direction so as to be inside the inner peripheral surface of the side wall part in the width direction such that the lower end does not overlap the side wall part in the standing direction.

2. The metal case according to claim 1, wherein the welding portion is formed by welding together the side wall part and a flange portion that is located on the outer peripheral edge of the bottom part, the flange portion being positioned on an upper side of the lower end of the bottom part in the standing direction of the side wall part.

3. The metal case according to claim 2, wherein a thickness of the flange portion is less than a thickness of a central region of the bottom part.

4. The metal case according to claim 2, wherein the flange portion includes a bent portion that is bent toward the upper side in the standing direction and is bent toward an outer side in a plan view of the bottom part.

5. The metal case according to claim 1, wherein a distance between the lower end and the welding portion is within a range of 0.2-5.0 mm.

6. The metal case according to claim 2, wherein a distance between the lower end and the welding portion is within a range of 0.2-5.0 mm.

7. The metal case according to claim 3, wherein a distance between the lower end and the welding portion is within a range of 0.2-5.0 mm.

8. The metal case according to claim 4, wherein a distance between the lower end and the welding portion is within a range of 0.2-5.0 mm.

9. The metal case according to claim 1, wherein the lower end of the bottom part is formed of a protruding part that protrudes to the lower side in the standing direction.

10. The metal case according to claim 2, wherein the lower end of the bottom part is formed of a protruding part that protrudes to the lower side in the standing direction.

11. The metal case according to claim 5, wherein the lower end of the bottom part is formed of a protruding part that protrudes to the lower side in the standing direction.

12. The metal case according to claim 6, wherein the lower end of the bottom part is formed of a protruding part that protrudes to the lower side in the standing direction.

13. The metal case according to claim 7, wherein the lower end of the bottom part is formed of a protruding part that protrudes to the lower side in the standing direction.

14. The metal case according to claim 8, wherein the lower end of the bottom part is formed of a protruding part that protrudes to the lower side in the standing direction.

15. The metal case according to claim 1, wherein the bottom part has an inner periphery contacting part that abuts on the inner peripheral surface of the side wall part.

16. The metal case according to claim 2, wherein the bottom part has an inner periphery contacting part that abuts on the inner peripheral surface of the side wall part.

17. The metal case according to claim 11, wherein the bottom part has an inner periphery contacting part that abuts on the inner peripheral surface of the side wall part.

18. The metal case according to claim 12, wherein the bottom part has an inner periphery contacting part that abuts on the inner peripheral surface of the side wall part.

19. The metal case according to claim 13, wherein the bottom part has an inner periphery contacting part that abuts on the inner peripheral surface of the side wall part.

20. The metal case according to claim 14, wherein the bottom part has an inner periphery contacting part that abuts on the inner peripheral surface of the side wall part.

* * * * *